March 1, 1966 O. J. OTT 3,238,382

CLIPPING CIRCUIT PRODUCING RECTANGULAR OUTPUT INDEPENDENT OF INPUT SIGNAL WAVESHAPE

Filed May 10, 1963

INVENTOR.
OWEN J. OTT

BY Kenyon & Kenyon

ATTORNEYS

United States Patent Office 3,238,382

Patented Mar. 1, 1966

3,238,382
CLIPPING CIRCUIT PRODUCING RECTANGULAR OUTPUT INDEPENDENT OF INPUT SIGNAL WAVESHAPE

Owen J. Ott, Brookfield, Conn., assignor to Data-Control Systems, Inc., Danbury, Conn., a corporation of Delaware Filed May 10, 1963, Ser. No. 279,449
9 Claims. (Cl. 307—88.5)

Figure 1:
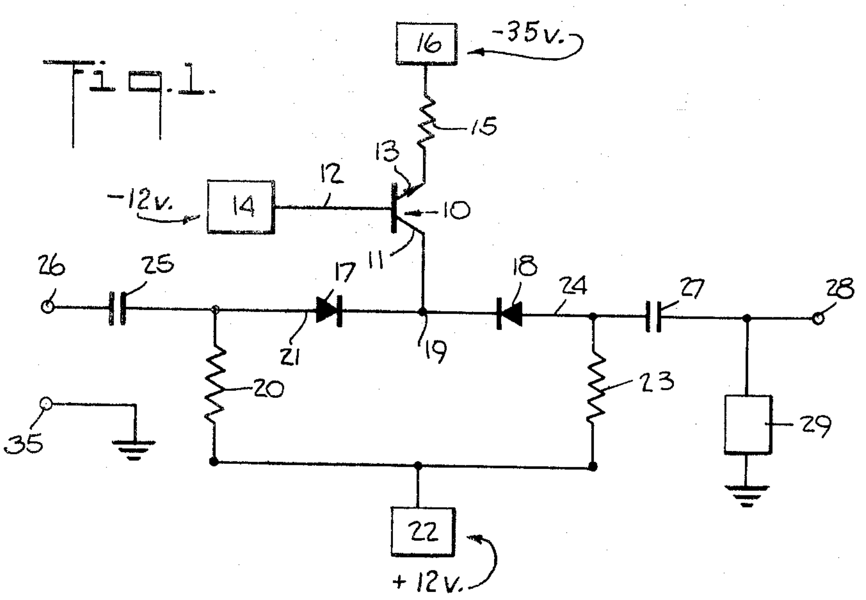

This invention relates to apparatus for providing a clipping action on an alternating voltage input signal. This invention relates more particularly to a squaring circuit which clips both positive and negative amplitude peaks, thereby providing a squared output signal.

A rectangular wave type of electrical signal is desirably utilized in various electronic devices. Thus, for example, a square wave can be used for timing purposes. It is suitable for use in triggering other types of equipment, and is also of value in determining the instant of axis crossing of alternating waves in precision frequency demodulators, and generating steeply rising and falling wave fronts in pulse circuitry.

These are several ways to achieve rectangular wave signals. The book by Millman and Taub, Pulse and Digital Circuits (McGraw-Hill Book Company, Inc., 1956) lists several types of circuits suitable for this purpose. These include the use of a pair of diode clippers (Pulse and Digital Circuits, page 116), a Schmitt trigger circuit (id., page 165), and multivibrators (id., page 174).

A distinction between clipping circuits of the above types is that some of them produce a rectangular wave which is independent of the shape of the input wave, whereas others produce a rectangular wave output which is directly related to the shape and symmetry of the input signal. In circuits of the latter type the rectangular wave is synchronized with the input wave form. This enables advantageous control of the output wave form.

It is an object of the present invention to provide a circuit which will produce a clipped output signal in response to an input signal.

It is a furthre object of the present invention to provide an alternating square wave output in response to a symmetrical alternating signal input.

Briefly stated, one embodiment of the present invention is a circuit for clipping an input signal comprising first and second semiconductor diodes connected in series to form a common junction, said diodes being poled to permit current flow therethrough toward the said common junction, a transistor having a base, collector and emitter, the said collector being connected to the said common junction and said base and emitter being connected to respective first and second fixed electrical potential sources, a first capacitor connected to the face of said first diode opposite the said common junction, first and second resistors having substantially equal resistances, a third fixed electrical potential source, said first resistor being connected between (1) the junction of said capacitor and said first diode, and (2) the said third potential source, said second resistor being connected between (1) the face of the said second diode opposite the said common junction, and (2) the said third potential source, a second capacitor, one side of said second capacitor being connected to the face of the said second diode opposite the said common junction, and a constant load impedance connected between (1) a reference potential source, and (2) the other side of said second capacitor.

Figures 2A, 2B:
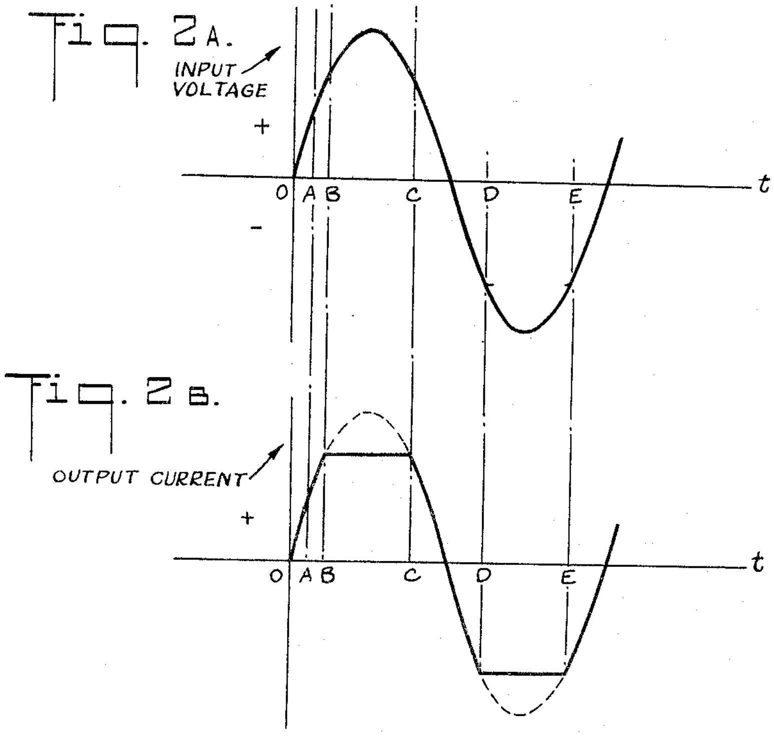

The invention will be more readily understood when described in conjunction with the drawings, in which:

FIG. 1 is a schematic circuit diagram representing one embodiment of the present invention; and FIGS. 2A and 2B are graphical representations of an input signal to the circuit of FIG. 1 and the output current therefrom, respectively.

Referring now to FIG. 1, there is depicted transistor 10 having collector element 11, base element 12 and emitter element 13. Emitter 13 is connected through a resistor 15 to a fixed potential source 16, and base element 12 is connected to fixed potential source 14.

Also depicted in FIG. 1 are two semiconductor diodes 17 and 18 connected in series to form common junction 19. Diodes 17 and 18 are poled to permit current flow therethrough toward common junction 19. Collector element 11 of transistor 10 is connected to common junction 19.

Resistor 20 is connected to face 21 of diode 17 opposite junction 19, and resistor 23 is connected to face 24 of diode 18 opposite junction 19. The other ends of resistors 20 and 23 are connected to fixed potential source 22.

Completing the circuit at the input end is capacitor 25 which is connected to the junction of resistor 20 and face 21 of diode 17. Input terminal 26 is connected to capacitor 25, the input signal being applied between input terminal 26 and terminal 35, the latter being connected to a reference potential source which in the embodiment shown in FIG. 1 is ground.

At the output end of the circuit shown in FIG. 1, capacitor 27 is connected to the junction of resistor 23 and face 24 of diode 18. Capacitor 27 is in turn connected to output terminal 28. Load 29 is connected between output terminal 28 and reference potential, or ground.

For convenience in describing the operation of the circuit of FIG. 1, the following values are assigned to the components of the circuit:

*Table I*

| | | |
|---|---|---|
| Fixed potential source **16** | volts | —35 |
| Fixed potential source **14** | do | —12 |
| Fixed potential source **22** | do | +12 |
| Resistor **20** | ohms | 24,000 |
| Resistor **23** | do | 24,000 |
| Resistor **15** | do | 24,000 |
| Load **29** | do | 200 |
| Capacitor **25** | microfarads | 1 |
| Capacitor **27** | do | 1 |

With the fixed potential sources set forth as above, transistor 10 should be of the NPN type. The diodes 17 and 18 are poled as shown in the drawing, with the arrow signifying the direction of conventional current flow.

The values of the fixed potential sources 16 and 14 and resistor 15 determine the collector-to-emitter current of transistor 10. As will be described below, it is desirable that common junction 19 be maintained at or near ground or reference potential, and the resistor is chosen with this in mind. For the values shown in Table I, and with a conventional type of transistor the collector-to-emitter current will be approximately one milliampere.

The connection of transistor 10 as shown in FIG. 1 is commonly termed a common base connection and is utilized to provide a high impedance at the collector 10. In such configuration the current flow from the collector to base is small compared to the collector-emitter current and may be considered negligible. The collector-to-emitter current is dependent almost entirely on the values chosen for resistor 15 and the fixed potential sources 14 and 16, and accordingly variations in the potential level of the collector element have no significant effect on the magnitude of this current.

In the circuit shown in FIG. 1, with no applied signal, the one milliampere of current flowing through transistor 10 is made up of two equal currents flowing from source 22 to junction 19 in two legs made up as follows: (1) resistor 20 and diode 17, and (2) resistor 23 and diode 18. For symmetrical operation of the circuit, the currents flowing in the above two legs ideally should be identical in value. Since the current flowing through transistor 10 is one milliampere, this would necessitate a current of one-half milliampere in each of the two legs.

As indicated above, the potential at junction 19 is to be controlled near ground or reference potential. The value in Table I for fixed potential source 22 is +12 volts. Therefore, the values of resistors 20 and 23 are determined by the current flow and potential drop, and in this instance the values of resistors 20 and 23 must be approximately 24,000 ohms. These resistance values for resistors 20 and 23 are, of course, predicated on the assumption that the resistances of diodes 17 and 18 are negligible. In the usual situation, when semiconductor diodes are in a conducting condition their resistance is negligible.

With the resistances 20, 23 and 29 chosen to have the values set forth in Table I, it is clear that diodes 17 and 18 are in a condition which will permit cut-off with a relatively small applied voltage. Thus, looking at diode 17, for example, it will conduct as long as the potential at face 21 is more positive than the potential at junction 19. As soon as the potential at face 21 is less positive than the potential at terminal 19, diode 17 will be cut off and will act as an essentially infinite impedance. This will occur when negative signal excursions are applied to terminal 26, since the low resistance load 29 prevents junction 19 from being driven negative more than approximately 0.1 volt from its quiescent condition. As soon as diode 17 is cut off further negative excursions of terminal 26 do not produce additional output at load 29, and thus the negative excursions of the signal are clipped.

When the input signal excursions are positive, diode 17 remains in the conducting state and causes junction 19 to follow these excursions. However, when the positive excursion of junction 19 reverse biases diode 18, transfer of further signal to the load is inhibited, thereby clipping the positive signal excursions.

Capacitors 25 and 27 are utilized primarily as D.C. blocking capacitors, and their values are chosen in accordance with considerations well known in the art.

Load 29 serves as the impedance across which the output signal is developed. Load 29, in its simplest form, can be a resistor. When utilized in a circuit having the aforementioned specific values, load 29 would have a small resistance compared to resistors 20 and 23. Alternatively, load 29 can be in the form of a transistor biased to provide a fixed low impedance, in a manner well understood in the art. Since the action of the circuit is to provide current-limited signals to the load, clipping of small input signals is facilitated by use of a low value of load resistor.

The operation of the circuit of FIG. 1 is as follows:

FIG. 2A is a graphical representation of a sine wave which is to be applied between terminals 26 and 35 of the circuit of FIG. 1. Using the time axis of FIG. 2A as a reference for this discussion, it is seen that at zero time the voltage applied is zero. At this instant there is one-half milliampere flowing in each of the two resistor-diode legs and one milliampere of current flowing through transistor 10.

As the amplitude of the signal of FIG. 2A begins to increase in a positive direction, a current flows from terminal 26 through diode 17. Since the current in transistor 10 is essentially independent of the voltage at junction 19, circuit considerations dictate that the input current is accompanied by a reduction in the current in diode 18. Thus a portion of the current flow through resistor 23 is diverted to flow through load 29 to ground. The current flow through load 29 develops a potential across load 29 which appears at output terminal 28. This is the condition at point A along the time axis of FIG. 2A. During this period the output signal as shown in FIG. 2B has the same shape as that of the input signal shown in FIG. 2A.

At point B on the time axis of FIG. 2A, a positive voltage is reached which causes cut-off of diode 18. Thus it is seen that as the potential at junction 19 increases due to the increase in amplitude of the input signal, a condition is reached at which the bias across diode 18 is reversed, thus causing cut-off. Under this condition, the entire current of one-half milliampere flowing through resistor 23 passes through capacitor 27 and through load 29 to ground. With the impedance of load 29 being small compared to resistor 23, there is provided a current at output terminal 28 of one-half milliampere. Since the transistor 10 still permits the flow of one milliampere, all of this current must be provided from the combination of the current flowing through resistor 20 and the current flowing from input terminal 26.

This condition continues for the entire time during which the amplitude of the input signal of FIG. 2A exceeds the value necessary to cut off diode 18. This is shown in FIG. 2B as the time between points B and C. With the values chosen as described above, the flat portion of the load current between points B and C of FIG. 2B has an amplitude of one-half milliampere.

At a time designated by point C on the time axis in FIGS. 2A and 2B, diode 18 commences to conduct and the signal applied at input terminal 26 is again reproduced at output terminal 28.

Looking now at the situation on the downward or negative swing of the signal of FIG. 2A, the negative-going signal at input terminal 26 causes part of the current flow through resistor 20 to be diverted to flow out through terminal 26. At the output end of the circuit, current flows from ground up through load 29 and thence through diode 18, thereby developing a negative voltage at output terminal 28. With the negative signal now appearing at input terminal 26, diode 18 conducts a current greater than diode 17. Thus, the output signal at terminal 28 follows the input signal.

The point is then reached at time D when the amplitude of the negative signal at face 21 of diode 17 attains a value sufficient to cut off diode 17. The one milliampere of current flowing through transistor 10 is then made up of one-half milliampere flowing through resistor 23 and one-half milliampere flowing up through load 29. Here again, the value of the load current during the flat portion of the signal in FIG. 2B would be equal to one-half milliampere, assuming the values set forth in Table I above.

Thus, the signal appearing at output terminal 28 is squared due to the alternate cut-off of diodes 17 and 18.

An important advantage of the circuit shown in FIG. 1 is the symmetrical impedance exhibited at the input and output portions of the circuit. Thus, when diode 17 is cut off, the input impedance is equal to the resistance of resisitor 20. When diode 18 is cut off, the impedance at the input of the circuit is represented by resistor 20 in parallel with the branch between junction 19 and source 16, namely, transistor 10 and resistor 15. In view of the base-to-emitter bias on transistor 10, the collector-emitter impedance presented is of the order of megohms. Accordingly, for practical purposes, the input impedance when diode 18 is cut off is equal solely to the resistance of resistor 20.

With respect to the output impedance, the situation is the same as that above in that the output impedance is substantially equal to the resistance of resistor 23. It is important that the collector-emitter impedance of transistor 10 be at least an order of magnitude greater than the resistance of either of resistors 20 or 23.

There is thus provided a circuit which is symmetrical, presenting the same input and output impedances regardless of the condition of the input signal during the time that clipping action is performed. This is an extremely important consideration in providing symmetrical squaring characteristics.

In addition, the circuit is advantageous because there are no capacitive paths which might tend to cause loss of high frequency response.

Although one example has been described above, it is to be appreciated that the present invention may be modified by one skilled in the art without departing from the spirit and scope of the invention.

What is claimed is:

1. A circuit for squaring an input signal comprising first and second semiconductor diodes connected in series to form a common junction, said diodes being poled to permit respective current flows therethrough in opposite directions with respect to said common junction, a transistor having a base, collector and emitter, the said collector being connected to the said common junction and said base and emitter being connected to respective first and second fixed electrical potential sources, a first capacitor connected to the face of said first diode opposite the said common junction, first and second resistors having substantially equal resistances, a third fixed electrical potential source, said first resistor being connected between (1) the junction of said capacitor and said first diode, and (2) the said third potential source, said second resistor being connected between (1) the face of the said second diode opposite the said common junction, and (2) the said third potential source, a second capacitor, one side of said second capacitor being connected to the face of the said second diode opposite the said common junction, and a constant impedance load connected between (1) a reference potential source, and (2) the other side of said second capacitor.

2. The circuit of claim 1 in which the said transistor is of the NPN type, and in which the said current flows through the said diodes are toward the said common junction.

3. A circuit for squaring an input signal comprising first and second semiconductor diodes connected in series to form a common junction, said diodes being poled to permit respective current flows therethrough in opposite directions with respect to the said common junction, a transistor having a base, collector and emitter, the said collector being connected to the said common junction and said base and emitter being connected to respective first and second fixed electrical potential sources, a first capacitor connected to the face of said first diode opposite the said common junction, first and second resistors having substantially equal resistances, a third fixed electrical potential source, said first resistor being connected between (1) the junction of said capacitor and said first diode, and (2) the said third potential source, said second resistor being connected between (1) the face of the said second diode opposite the said common junction, and (2) the said third potential source, a second capacitor, one side of said second capacitor being connected to the face of the said second diode opposite the said common junction, and a transistor connected between (1) a reference potential source and (2) the other side of said second capacitor, said transistor being biased to exhibit a constant impedance between said reference potential source and the other side of said second capacitor.

4. A circuit for squaring an input signal comprising first and second unidirectional current switching means connected in series to form a common junction, said switching means being poled to permit respective current flows therethrough in opposite directions with respect to the said common junction, current regulating means connected between a fixed electrical potential source and said common junction, the current flow through said current regulating means being substantially independent of the electrical potential at said common junction, a first current path means connected to the side of said first switching means opposite said common junction, an input terminal connected to the junction of said first current path means and the said side of said first switching means, a second current path means connected to the side of said second switching means opposite said common junction and connected to said first current path means, and an output terminal connected to the junction of said second current path means and the said side of said second switching means.

5. A circuit for squaring an input signal comprising first and second unidirectional current switching means connected in series to form a common junction, said switching means being poled to permit respective current flows therethrough in opposite directions with respect to the said common junction, current regulating means connected between a fixed electrical potential source and said common junction, the current flow through said current regulating means being substantially independent of the electrical potential at said common junction, a first current path means connected to the side of said first switching means opposite said common junction, an input terminal connected to the junction of said first current path means and the said side of said first switching means, a second current path means connected to the side of said second switching means opposite said common junction and connected to said first current path means and a constant impedance load connected to the side of said second switching means opposite said common junction.

6. A circuit for squaring an input signal comprising first and second unidirectional current switching means connected in series to form a common junction, said switching means being poled to permit respective current flows therethrough in opposite directions with respect to the said common junction, current regulating means connected between a first fixed electrical potential source and said common junction, the current flow through said current regulating means being substantially independent of the electrical potential at said common junction, first and second resistors having substantially equal resistances, a second fixed electrical potential source, said first resistor being connected between (1) the side of said first switching means opposite the said common junction and (2) the said second potential source, said second resistor being connected between (1) the side of said second switching means opposite said common junction and (2) said second potential source, and a constant impedance load connected between (1) a reference potential source and (2) the side of said second switching means opposite said common junction.

7. A circuit for squaring an input signal comprising first and second semiconductor diodes connected in series to form a common junction, said diodes being poled to permit respective current flows therethrough toward the said common junction, a current regulating means connected between a first fixed electrical potential source and said common junction, the current flow through said current regulating means being substantially independent of the electrical potential at said common junction, first and second resistors having substantially equal resistances, a second fixed electrical potential source, said first resistor being connected between (1) the side of said first diode opposite the said common junction and (2) the said second potential source, said second resistor being connected between (1) the side of said second diode opposite said common junction and (2) said second potential source, and a constant impedance load connected between (1) a reference potential source and (2) the side of said second diode opposite said common junction.

8. A circuit for squaring an input signal comprising first and second semiconductor diodes connected in series to form a common junction, said diodes being poled to permit respective current flows therethrough in opposite directions with respect to the said common junction, a transistor having a base, collector and emitter, said collector being connected to the said common junction and said base and emitter being connected to respective first and second fixed electrical potential sources, first and second resistors having substantially equal resistances, a third fixed electrical potential source, said first resistor being connected between (1) the side of said first diode opposite said common junction, and (2) the said third potential source, said second resistor being connected between (1) the side of said second diode opposite the said common junction, and (2) the said third potential source, and a constant impedance load connected between (1) a reference potential source, and (2) the side of said second diode opposite said common junction.

9. A circuit for squaring an input signal comprising first and second semiconductor diodes connected in series to form a common junction, said diodes being poled to permit respective current flows therethrough in opposite directions with respect to the said common junction, a transistor having a base, collector and emitter, said collector being connected to the said common junction, said base being connected to a first fixed electrical potential source and said emitter being connected to a second fixed electrical potential source through a first resistor, a first capacitor connected to the face of said first diode opposite the said common junction, second and third resistors having substantially equal resistances, a third fixed electrical potential source, said second resistor being connected between (1) the junction of said capacitor and said first diode, and (2) the said third potential source, said third resistor being connected between (1) the face of the said second diode opposite the said common junction, and (2) the said third potential source, a second capacitor, one side of said second capacitor being connected to the face of the said second diode opposite the said common junction, and a constant impedance load connected between (1) a reference potential source, and (2) the other side of said second capacitor, the base-to-emitter bias on said transistor being arranged to provide a collector-emitter impedance which is at least an order of magnitude greater than the resistance of either of said second or third resistors.

References Cited by the Examiner

UNITED STATES PATENTS

| | | | |
|---|---|---|---|
| 2,877,421 | 3/1959 | Emanuelsson | 307—88.5 |
| 3,064,143 | 11/1962 | Sanderson | 307—88.5 |

ARTHUR GAUSS, *Primary Examiner.*